Aug. 7, 1928.

F. GRADY 1,679,937

HEATER

Filed June 22, 1925

INVENTOR
Franklin Grady.
BY
A.A. de Romeville
ATTORNEY

Patented Aug. 7, 1928.

1,679,937

UNITED STATES PATENT OFFICE.

FRANKLIN GRADY, OF NEW YORK, N. Y.

HEATER.

Application filed June 22, 1925. Serial No. 38,772.

This invention relates to a heater.

The object of the invention is the production of a heater whereby air is heated, which automatically contacts with a cooking vessel or heating chamber. The second object of the invention is the production of a heater, wherein the loss of heat by radiation is reduced to a minimum. The third object of the invention is the production of a heater whereby the quantity of air to be heated is controlled, limiting the amount of heated air which comes in contact with a cooking vessel or a baking compartment. The fourth object of the invention is the production of a heater in which the temperature in the heating chamber thereof can be easily controlled. The fifth object of the invention is the production of a heater which is adapted to domestic purposes.

Figure 1:
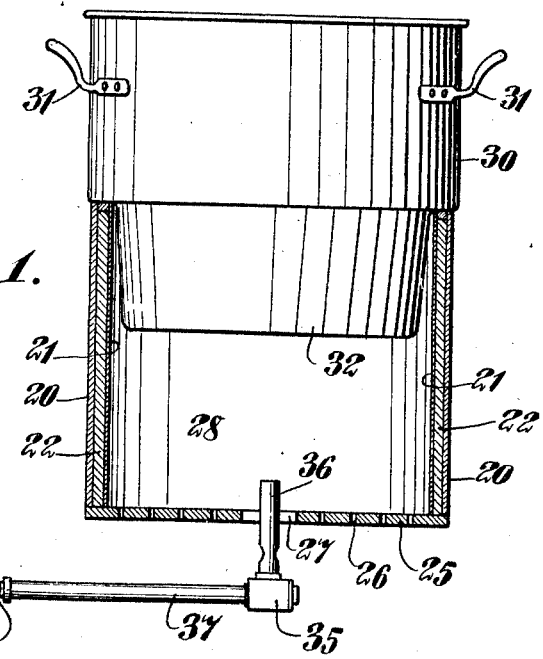
Figure 2:
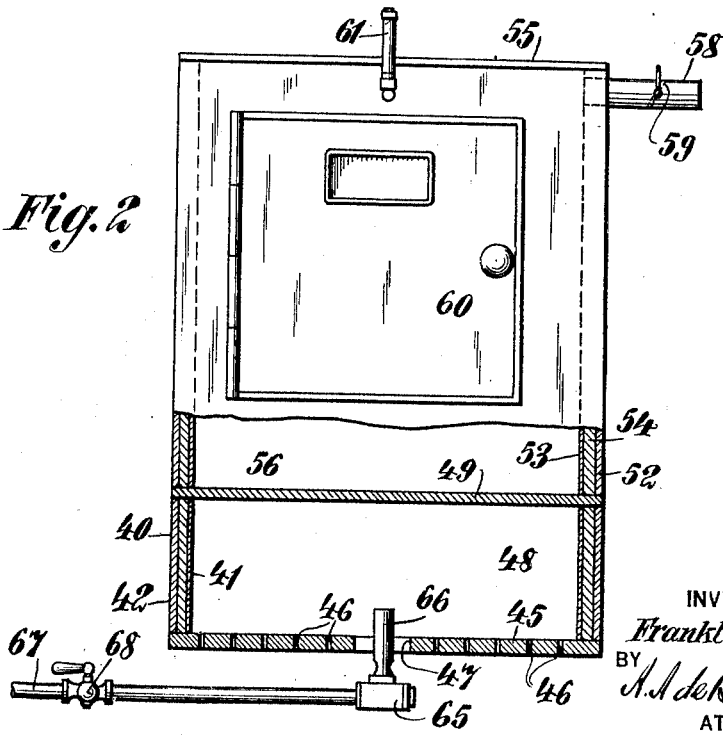

In the accompanying drawings Fig. 1 shows an elevation in partial axial section, exemplifying one form of the heater and Fig. 2 shows an elevation also partly in axial section of another form of the heater.

Referring to Fig. 1, a heater is indicated with a casing comprising the outer shell 20 and the inner shell 21. Said shells may be either cylindrical or rectangular in cross section. Between the said shells is located heat insulating material 22 preferably asbestos. A bottom wall 25 with a plurality of openings 26 and the central opening 27 supports and is fastened to said shells to form the heating chamber 28. A vessel 30 with the handles 31 is indicated with the depending portion 32, which extends into the shell 21. The vessel 30 is detachably supported on the shells. A Bunsen burner 35 is shown with the outlet pipe 36, and the inlet pipe 37 with the gas controlling valve 38. The pipe 36 preferably extends into the chamber 28.

Referring to Fig. 2 the heater is indicated with a casing comprising the outer shell 40, the inner shell 41 with an heat insulating material 42 between them. Said shells may be cylindrical or rectangular in cross section. A bottom wall 45 with the opening 46 and the central opening 47 supports and is fastened to said shells to form the heating chamber 48. A top wall 49 is connected to said shells 40 and 41. An outer shell 52 and an inner shell 53 extend up from the wall 49, and have preferably located between them a heat insulating material 54 like asbestos. A top 55 is provided for the shells 52 and 53. The latter shells with the top 55 and the wall 49 form a baking chamber 56. An outlet conduit 58 with a damper valve 59 extends through and from the shells 52 and 53. A door 60 is provided for the compartment 56 as well as a thermometer 61.

A Bunsen burner 65 is shown with the outlet pipe 66 and the inlet pipe 67 with the valve 68. The pipe 66 preferably extends into the chamber 48. To use the heater indicated in Fig. 1, the water, fluid or other material to be heated is placed in the vessel 30. The valve 38 is opened and the gas that flows from the outlet pipe 36 is lit. The air in the chamber 28 is heated and an inflow of air is induced through the central opening 27. The air rises and impinges against the bottom and side walls of the depending portion 32 of the vessel 30. After the heated air imparts its heat to said vessel 30, it falls and flows through the openings 26 of the wall 25 to be displaced by fresh air entering the opening 27.

To use the heater shown in Fig. 2, the air in the chamber 48 is heated and displaced as described for Fig. 1. The chamber 56 is thereby heated and the temperature of the air therein is controlled by the damper valve 59. The thermometer 61 indicates the temperature of the air in the chamber 56. The inner shells 21 and 53 may be omitted if desired.

It is to be noted that the amount of heat imparted to the chamber 28 is controlled by the valve 38, and to the chamber 48 by the valve 68. In place of the burners 35 and 65, oil burners, electric heaters or other sources of heat may be used.

Various modifications may be made in the invention and the present exemplification is to be taken as illustrative and not limitative thereof.

Having described my invention what I desire to secure by Letters Patent and claim is:

In a heater of the character described the combination of a casing, said casing comprising an outer shell and an inner shell, insulating material between the shells, a bottom wall for the casing containing an opening for the inflow of air, a burner located to direct its heat through said opening into said casing, said bottom wall also having a plurality of other openings for the discharge of air after having performed its function, a wall dividing said casing into two chambers, and a top for said casing, said insulation extending throughout the side walls to insulate both the lower and upper chambers, a valved vent at the upper part of the upper chamber, and a door in one side wall of the upper chamber.

In testimony whereof I affix my signature.

FRANKLIN GRADY.